United States Patent
Shibayama et al.

(10) Patent No.: US 10,767,525 B2
(45) Date of Patent: Sep. 8, 2020

(54) PLUGGED HONEYCOMB STRUCTURE, AND MANUFACTURING METHOD OF PLUGGED HONEYCOMB STRUCTURE

(71) Applicant: NGK INSULATORS, LTD., Nagoya (JP)

(72) Inventors: Takayoshi Shibayama, Nagoya (JP); Masaki Houra, Nagoya (JP); Takayuki Sakamoto, Nagoya (JP); Hiroyuki Suenobu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 513 days.

(21) Appl. No.: 15/427,419

(22) Filed: Feb. 8, 2017

(65) Prior Publication Data

US 2017/0234181 A1 Aug. 17, 2017

(30) Foreign Application Priority Data

Feb. 17, 2016 (JP) .................... 2016-028352

(51) Int. Cl.
| | | |
|---|---|---|
| *F01N 3/022* | (2006.01) | |
| *B01D 46/00* | (2006.01) | |
| *B01D 46/24* | (2006.01) | |
| *C04B 38/00* | (2006.01) | |

(52) U.S. Cl.
CPC ....... *F01N 3/0222* (2013.01); *B01D 46/0001* (2013.01); *B01D 46/244* (2013.01); *B01D 46/247* (2013.01); *B01D 46/2429* (2013.01); *B01D 46/2459* (2013.01); *C04B 38/0012* (2013.01); *B01D 2046/2433* (2013.01);
(Continued)

(58) Field of Classification Search
None
See application file for complete search history.

(56) References Cited

U.S. PATENT DOCUMENTS

2005/0120691 A1 6/2005 Miwa
2006/0062961 A1 3/2006 Kaneda et al.
(Continued)

FOREIGN PATENT DOCUMENTS

| EP | 2 236 783 A1 | 10/2010 |
|---|---|---|
| JP | 2003-269132 A1 | 9/2003 |

(Continued)

OTHER PUBLICATIONS

German Office Action (Application No. 10 2017 202 249.3) dated Sep. 26, 2018 (with partial English translation).
(Continued)

*Primary Examiner* — Humera N. Sheikh
*Assistant Examiner* — Mary I Omori
(74) *Attorney, Agent, or Firm* — Burr & Brown, PLLC (57) ABSTRACT

A plugged honeycomb structure has a plurality of cells defined by partition walls to become through channels for fluid, one end of each of the predetermined cells is plugged by a plugging member, the other end of each of the residual cells is plugged by the plugging member, the partition wall is made of a cordierite component as a main component, and a value obtained by dividing Young's modulus of a plugging structure portion formed by the partition walls and the plugging member by Young's modulus of a cell structure portion formed by the partition walls is in a range of 1.05 to 2.00.

5 Claims, 3 Drawing Sheets (52) U.S. Cl.
CPC .. *B01D 2046/2437* (2013.01); *F01N 2330/06* (2013.01); *Y02T 10/20* (2013.01)

(56) References Cited

U.S. PATENT DOCUMENTS

| | | | |
|---|---|---|---|
| 2006/0112669 A1* | 6/2006 | Yamada | B28B 11/006 |
| | | | 55/523 |
| 2006/0216465 A1* | 9/2006 | Kai | B01D 46/2429 |
| | | | 428/116 |
| 2007/0210485 A1 | 9/2007 | Hatano et al. | |
| 2008/0236115 A1* | 10/2008 | Sakashita | B01D 46/244 |
| | | | 55/385.3 |
| 2009/0098336 A1* | 4/2009 | Kaneda | C04B 38/0006 |
| | | | 428/117 |
| 2009/0246458 A1 | 10/2009 | Yamada et al. | |
| 2011/0304073 A1* | 12/2011 | Tokunaga | B28B 11/006 |
| | | | 264/273 |
| 2013/0247525 A1 | 9/2013 | Tsuchiya et al. | |

FOREIGN PATENT DOCUMENTS

| | | |
|---|---|---|
| JP | 2004-154692 A1 | 6/2004 |
| JP | 2004-188278 A | 7/2004 |
| JP | 2009-072760 A1 | 4/2009 |
| JP | 2011-189252 A1 | 9/2011 |
| JP | 2013-223856 A1 | 10/2013 |

OTHER PUBLICATIONS

Japanese Third Party Offer of Information (Application No. 2016-28352) dated Feb. 4, 2019.
Japanese Office Action (with English translation), Japanese Application No. 2016-028352, dated Jul. 2, 2019 (8 pages).
Saito et al., "Ceramic Powder Molding Wall, Ceramic Substrate Optical Research Center," vol. 7, pp. 29-33, dated Mar. 31, 2008, URL, http://id.nii.ac.jp/1476/00002257 (17 pages).

* cited by examiner

PLUGGED HONEYCOMB STRUCTURE, AND MANUFACTURING METHOD OF PLUGGED HONEYCOMB STRUCTURE

The present application is an application based on JP-2016-028352 filed on Feb. 17, 2016 with Japan Patent Office, the entire contents of which are incorporated herein by reference.

BACKGROUND OF THE INVENTION

Field of the Invention

The present invention relates to a plugged honeycomb structure, and a manufacturing method of the plugged honeycomb structure. More particularly, the present invention relates to a plugged honeycomb structure which is for use in a diesel particulate removing filter (DPF) or the like and is capable of trapping and removing particulates constituted of particulate matter, and also relates to a manufacturing method of the plugged honeycomb structure.

Description of the Related Art

Heretofore, honeycomb structures made of ceramics have been applied to various uses in a car exhaust gas purifying catalyst carrier, a diesel particulate removing filter, a heat reservoir for a burning device and the like. For example, the diesel particulate removing filter is used to trap particulate matter in an exhaust gas emitted from a diesel engine, and in the filter, a honeycomb structure (a plugged honeycomb structure) is usually used in which one end of each predetermined cell is plugged by a plugging member and the other end of each of the residual cells is plugged by the plugging member.

In the above plugged honeycomb structure, a ceramic material such as a cordierite component or a silicon carbide component is used. For the purpose of achieving decrease of pressure loss of the plugged honeycomb structure, increasing of a porosity of a partition wall constituting the plugged honeycomb structure is advanced (see, e.g., Patent Documents 1 and 2).

When the increasing of the porosity of the partition wall is performed, a mechanical strength of the plugged honeycomb structure necessarily decreases. As a result, especially a partition wall portion of each cell end is easy to crack. To eliminate such a problem, there has been suggested development of a plugged honeycomb structure whose end portions are hard to crack and which is excellent in durability (see, e.g., Patent Document 3).

[Patent Document 1] JP-A-2003-269132
[Patent Document 2] JP-A-2011-189252
[Patent Document 3] JP-A-2004-154692

SUMMARY OF THE INVENTION

As described above, it is known that with increase of a porosity of partition walls of a plugged honeycomb structure, and the like, cracks are generated in the partition walls at ends of cells. Further specifically, the plugged honeycomb structure is mainly used as a DPF as described above. At this time, the plugged honeycomb structure is received (canned) in a metal case via a cushion material. In a canning step, strong pressure (stress) might be applied to a circumferential surface of the plugged honeycomb structure.

As a result, shearing stress is generated in a boundary surface between each plugging portion formed of a plugging member and the partition wall. Here, it is known that the shearing stress gradually increases from a center of the plugged honeycomb structure toward the vicinity of a circumference thereof. Consequently, when the stress is in excess of a shearing strength of the partition wall, the cracks are generated from the circumference of the plugged honeycomb structure toward the inside thereof in the boundary surface of the partition wall, and a defect such as plug peeling occurs in corner portions (edge portions) of the plugged honeycomb structure.

In particular, when Young's modulus of the plugging member is noticeably different from Young's modulus of the partition wall, the above shearing stress increases, the plugging portions cannot be distorted in accordance with distortion of the partition wall, and the above-mentioned local stress concentration easily occurs. As a result, in a case where the Young's modulus of each plugging portion is noticeably larger than the Young's modulus of the partition wall, breakages (cracks) are easy to occur in the partition wall which is in contact with the plugging portion. In a plugged honeycomb structure disclosed in Patent Document 3, attention is paid to the Young's modulus of each of the plugging member and the partition wall, and the plugged honeycomb structure is useful in that it is possible to eliminate the above disadvantage to a certain degree by adjusting the Young's modulus of the plugging member to be smaller than the Young's modulus of the partition wall. However, the generation of the cracks in the partition wall portions of the cell ends cannot sufficiently be prevented.

To eliminate such a problem, as a result of earnest studies, the present applicant has found that it is possible to further securely inhibit the generation of the cracks at the ends of the cells by relaxing the shearing stress generated in a boundary between "a plugging structure portion" constituted of the partition walls and the plugging member (the plugging portions) and "a cell structure portion" positioned between the plugging structure portions in a central portion of the plugged honeycomb structure constituted by the partition walls.

Young's modulus of the plugging structure portion is larger than Young's modulus of the cell structure portion, and hence in a case of applying strong pressure (stress) to the circumferential surface of the plugged honeycomb structure in the above canning step, the shearing stress is generated in the boundary between the plugging structure portion and the cell structure portion. In a case where the Young's modulus of the plugging structure portion is remarkably larger than the Young's modulus of the cell structure portion, the shearing stress of the above boundary portion is in excess of the shearing strength of the cell structure portion, and the cracks at the ends of the cells are generated in the boundary between the plugging structure portion and the cell structure portion.

On the other hand, during use of the plugged honeycomb structure, heating and cooling repeat in the plugged honeycomb structure to cause temperature change. Consequently, due to the above temperature change and differences in thermal expansion coefficient and Young's modulus between the plugging structure portion and the cell structure portion, the shearing stress repeats its generation in the boundary between the plugging structure portion and the cell structure portion. It is known that there eventually occurs a fatigue phenomenon in which fine cracks are formed in the boundary between the plugging structure portion and the cell structure portion and a strength around the boundary decreases. As a result, in a case where a high-temperature fluid flows into the plugged honeycomb structure at a high rate, there occurs the disadvantage that a part of the plugging structure portion blows and flies due to the high-rate fluid in the boundary between the plugging structure portion and the cell structure portion in which the fatigue phenomenon is caused.

Therefore, there might be a case where the shearing stress generated in the boundary between the plugging structure portion and the cell structure portion cannot sufficiently be eliminated simply by adjusting the above-mentioned Young's modulus of the plugging member to be smaller than the Young's modulus of the partition wall. It is not possible to eliminate the disadvantage that further repeating thermal shock causes the fatigue phenomenon in the plugging portions and that the plugging portions drop out from the cells.

A ratio of the Young's modulus between the plugging structure portion and the cell structure portion is stipulated in a predetermined range, so that it is possible to manufacture the plugged honeycomb structure in which the generation of the cracks at the ends of the cells is more securely inhibited. Furthermore, a porosity, an average pore diameter and a thermal expansion coefficient of each of the plugging structure portion and the cell structure portion of the plugged honeycomb structure are stipulated, and it is possible to manufacture the plugged honeycomb structure in which the generation of the cracks does not occur in end portions and any plugging portions do not drop out from the cells.

Thus, the present invention has been developed in view of the above actual situation, an object thereof is to provide a plugged honeycomb structure whose end portions are hard to crack and which has a sufficient strength and is excellent in durability and does not cause dropping-out of plugging portions, and another object is to provide a manufacturing method of the plugged honeycomb structure.

According to the present invention, there are provided a plugged honeycomb structure and a manufacturing method of the plugged honeycomb structure to achieve the above objects.

According to a first aspect of the present invention, a plugged honeycomb structure is provided having a plurality of cells defined by partition walls to become through channels for fluid, one end of each of the predetermined cells being plugged by a plugging member, the other end of each of the residual cells being plugged by the plugging member, wherein the partition wall is made of a cordierite component as a main component, and a value obtained by dividing Young's modulus of a plugging structure portion formed by the partition walls and the plugging member by Young's modulus of a cell structure portion formed by the partition walls is in a range of 1.05 to 2.00.

According to a second aspect of the present invention, the plugged honeycomb structure according to the above first aspect is provided, wherein a porosity of the plugging structure portion is 80% or less, a porosity of the cell structure portion is in a range of 42% to 70%, and a value obtained by dividing the porosity of the plugging structure portion by the porosity of the cell structure portion is in a range of 1.10 to 1.30.

According to a third aspect of the present invention, the plugged honeycomb structure according to the above first or second aspects is provided, wherein an average pore diameter of the plugging structure portion is in a range of 10 μm to 30 μm.

According to a fourth aspect of the present invention, the plugged honeycomb structure according to any one of the above first to third aspects is provided, wherein a value obtained by subtracting a thermal expansion coefficient of the cell structure portion from a thermal expansion coefficient of the plugging structure portion in a diametric direction which is perpendicular to a long axis direction of the plugged honeycomb structure is in a range of $\pm 0.3 \times 10^{-6}$/K.

According to a Fifth aspect of the present invention, a manufacturing method of a plugged honeycomb structure to manufacture the plugged honeycomb structure according to any one of the above first to fourth aspects is provided which has a plurality of cells defined by partition walls to become through channels for fluid, one end of each of the predetermined cells being plugged by a plugging member, the other end of each of the residual cells being plugged by the plugging member, wherein the plugging member includes a ceramic raw material, a pore former, a surfactant, and a thickener, the pore former is mixed at a ratio of 1 wt % to 30 wt % to a total amount of the plugging member, and the thickener is mixed at a ratio of 0.1 wt % to 3.0 wt % to the total amount of the plugging member.

According to a first aspect of the present invention, a plugged honeycomb structure is provided having a plurality of cells defined by partition walls to become through channels for fluid, one end of each of the predetermined cells being plugged by a plugging member, the other end of each of the residual cells being plugged by the plugging member, wherein the partition wall is made of a cordierite component as a main component, and a value obtained by dividing Young's modulus of a plugging structure portion formed by the partition walls and the plugging member by Young's modulus of a cell structure portion formed by the partition walls is in a range of 1.05 to 2.00.

According to a second aspect of the present invention, the plugged honeycomb structure according to the above first aspect is provided, wherein a porosity of the plugging structure portion is 80% or less, a porosity of the cell structure portion is in a range of 42% to 70%, and a value obtained by dividing the porosity of the plugging structure portion by the porosity of the cell structure portion is in a range of 1.10 to 1.30.

According to a third aspect of the present invention, the plugged honeycomb structure according to the above first or second aspects is provided, wherein an average pore diameter of the plugging structure portion is in a range of 10 μm to 30 μm.

According to a fourth aspect of the present invention, the plugged honeycomb structure according to any one of the above first to third aspects is provided, wherein a value obtained by subtracting a thermal expansion coefficient of the cell structure portion from a thermal expansion coefficient of the plugging structure portion in a diametric direction which is perpendicular to a long axis direction of the plugged honeycomb structure is in a range of $\pm 0.3 \times 10^{-6}$/K.

According to a Fifth aspect of the present invention, a manufacturing method of a plugged honeycomb structure to manufacture the plugged honeycomb structure according to any one of the above first to fourth aspects is provided which has a plurality of cells defined by partition walls to become through channels for fluid, one end of each of the predetermined cells being plugged by a plugging member, the other end of each of the residual cells being plugged by the plugging member, wherein the plugging member includes a ceramic raw material, a pore former, a surfactant, and a thickener, the pore former is mixed at a ratio of 1 wt % to 30 wt % to a total amount of the plugging member, and the thickener is mixed at a ratio of 0.1 wt % to 3.0 wt % to the total amount of the plugging member.

According to a plugged honeycomb structure of the present invention, a value obtained by dividing Young's modulus of a plugging structure portion formed by partition walls and a plugging member by Young's modulus of a cell structure portion formed by the partition walls is set to a pre-stipulated range (1.05 to 2.00), so that in a case where stress is applied, it is possible to decrease a difference in distortion between both the portions, to relax partial stress concentration and to inhibit generation of cracks. In particular, a cordierite component is usable as a ceramic material, and it is possible to inhibit decrease of a strength of the plugged honeycomb structure in which increase of a porosity is advanced. Furthermore, porosities of the plugging structure portion and the cell structure portion are set, a porosity ratio is stipulated, an average pore diameter of the plugging structure portion is stipulated and a difference in thermal expansion coefficient between the plugging structure portion and the cell structure portion is stipulated, so that it is possible to more accurately inhibit the generation of the cracks.

According to a manufacturing method of the plugged honeycomb structure of the present invention, in the plugging member for use, a pore former and a thickener are mixed at respective predetermined ratios to a total amount of the plugging member, it is possible to impart fluidity of the plugging member to cells, and it is possible to increase productivity of the plugged honeycomb structure.

DESCRIPTION OF THE PREFERRED EMBODIMENTS

Hereinafter, embodiments of a plugged honeycomb structure and a manufacturing method of the plugged honeycomb structure of the present invention will be described in detail with reference to the drawings. It is to be noted that the plugged honeycomb structure and the manufacturing method of the plugged honeycomb structure of the present embodiments are not especially limited to the following embodiments, and various design changes, modifications and improvements and the like can be added without departing from the gist of the present invention.

1. Plugged Honeycomb Structure

As shown mainly in FIG. 1 to FIG. 4, a plugged honeycomb structure 1 of the present embodiment includes a honeycomb portion 6 having a plurality of quadrangular cells 3 defined by lattice-like partition walls 2 made of porous ceramics to become through channels for fluid, and a circumferential wall portion 7 which covers a circumferential portion of the honeycomb portion 6, and has a plurality of plugging portions 5a in which one end 4a of each predetermined cell 3 is plugged by a plugging member and a plurality of plugging portions 5b in which the other end 4b of each residual cell 3 is plugged by the plugging member.

The plugged honeycomb structure 1 is used as a filter member of a diesel particulate removing filter (the DPF) or the like, and in the partition wall 2 constituting the plugged honeycomb structure 1, a cordierite component which is one type of porous ceramics is used. In consequence, it is possible to exert low pressure loss properties. Here, a shape of the plugged honeycomb structure 1 is not especially limited, and in addition to a round pillar shape shown in FIG. 1 or the like, various shapes such as a polygonal pillar shape and an elliptic pillar shape may be formed. Furthermore, a cross-sectional shape of the cell 3 formed as each through channel for the fluid is not limited to such a quadrangular shape as described above, and a combination of the quadrangular shape and an octagonal shape, or a hexagonal shape may be formed.

There is not any special restriction on a cell density of the cells 3 defined by the partition walls 2 made of cordierite and a partition wall thickness, it is possible to employ the cell density and the partition wall thickness of usual ranges in the plugged honeycomb structure 1 of the present invention, and it is possible to use, for example, a plugged honeycomb structure having a cell density from 85 to 400 cpsi (from 13 to 93 cells/cm$^2$) and a partition wall thickness from 4 to 25 mil (from 0.10 to 0.64 mm) Here, "cpsi (cells per square inch)" indicates the number of the cells 3 to be included per area of 1 square inch.

Figure 4:
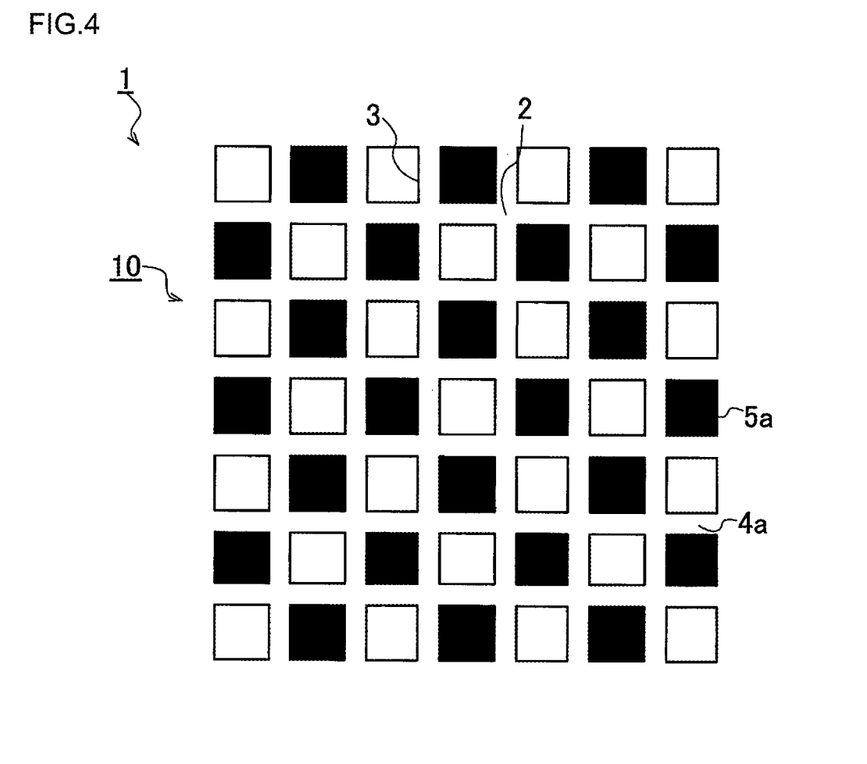
FIG. 4 is a partially enlarged front view of FIG. 3.

As shown mainly in FIG. 1 to FIG. 4, the plugged honeycomb structure 1 of the present embodiment has the plurality of cells 3 each of which is open in the one end 4a or the other end 4b, and the plugging portions 5a and 5b formed by charging the plugging member into the ends 4a and 4b of the cells 3 to plug the cells 3. Here, the plugging portions 5a and 5b are formed in accordance with an arrangement standard to alternately plug the cells 3 at the ends 4a and 4b, and the plugging portions possess a checkered pattern (or a checkerboard pattern) as shown in FIG. 4. There is not any special restriction on the arrangement standard of the plugging portions 5a and 5b, and any arrangement standard may be employed.

Figure 1:
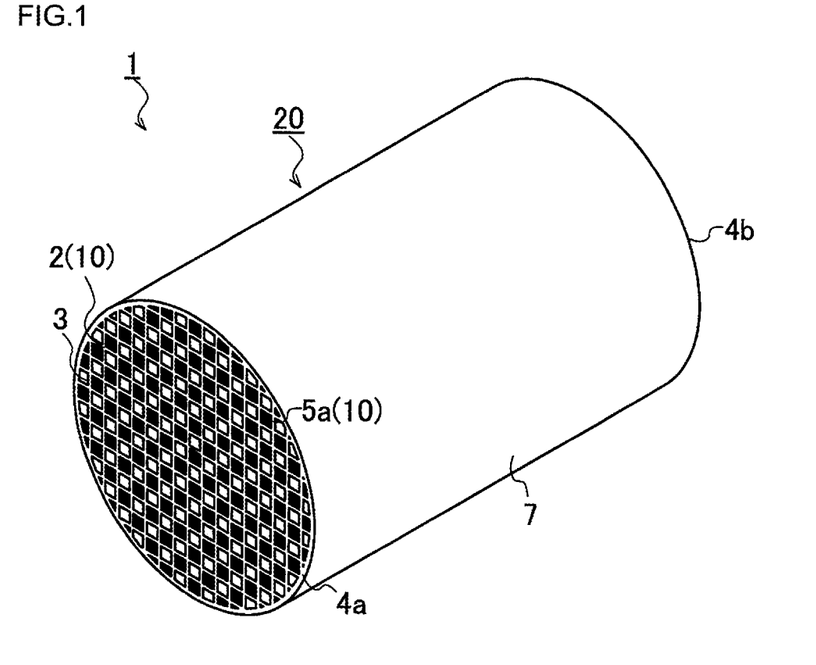
FIG. 1 is a perspective view schematically showing an outline constitution of a plugged honeycomb structure of one embodiment of the present invention.
Figure 2:
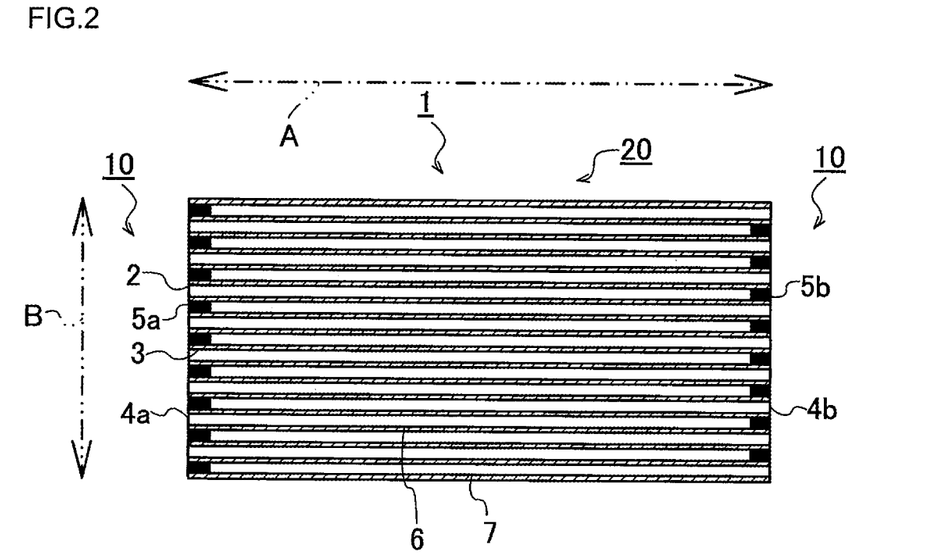
FIG. 2 is a cross-sectional view schematically showing the outline constitution of the plugged honeycomb structure.
Figure 3:
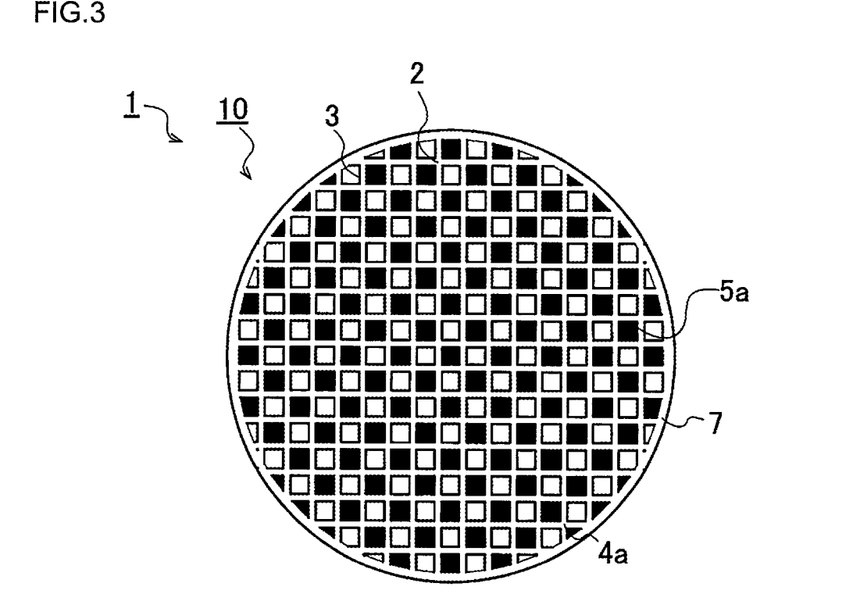
FIG. 3 is a front view showing an outline constitution of one end of each cell of the plugged honeycomb structure.

It is to be noted that in the plugged honeycomb structure 1 of the present embodiment, a constitution including the partition walls 2 at the end 4a or 4b of each of the cells 3 and the plugging portions 5a or 5b formed by the plugging member is defined as "a plugging structure portion 10", whereas a constitution constituted of the partition walls 2 between a pair of plugging structure portions 10 is defined as "a cell structure portion 20" (see FIG. 2).

The plugged honeycomb structure 1 of the present embodiment is set so that a Young's modulus ratio (=YA/YB) corresponding to a value obtained by dividing Young's modulus YA of the plugging structure portion in the above-mentioned plugging structure portion 10 (the partition walls 2+the plugging portions 5a or 5b) by Young's modulus YB of the cell structure portion in the cell structure portion 20 (the partition walls 2) is in a range of 1.05 to 2.00. The Young's modulus ratio is preferably in a range of 1.20 to 2.00 and further preferably in a range of 1.50 to 2.00.

That is, it is set that the plugged honeycomb structure indicates a relation (YA>YB) of the Young's modulus YA of the plugging structure portion which is larger than the Young's modulus YB of the cell structure portion and that the Young's modulus of the plugging structure portion is slightly larger as much as 1.05 times or more and 2.00 times or less. Consequently, even in a case where stress is applied, a difference in distortion between the plugging structure portion 10 and the cell structure portion 20 does not increase, and it is possible to inhibit generation of cracks in a boundary between the plugging portion 5a or 5b and the partition wall 2. Here, each of the Young's moduli YA and YB of the plugging structure portion and the cell structure portion is obtained by measuring a value in a diametric direction B (see FIG. 2) which is perpendicular to a long axis direction A of the plugged honeycomb structure 1.

The Young's modulus ratio is limited to the above range, so that even in the case where the stress is applied, the difference in distortion between the plugging structure portion 10 and the cell structure portion 20 does not increase, and it is possible to inhibit the generation of the cracks in the boundary between the plugging portion 5a or 5b and the partition wall 2. Further specifically, when the stress is applied, the plugging structure portions 10 and the cell structure portion 20 are to be elastically deformed on the basis of the respective Young's moduli YA and YB. Especially, when the Young's modulus ratio is adjusted into 2.00 times or less, it is possible to decrease the difference in distortion in the case of applying the stress, as much as possible, and it is possible to inhibit the generation of the cracks or the like.

Furthermore, in the plugged honeycomb structure 1, the other characteristics are set so that a porosity PA of the plugging structure portion is 80% or less and a porosity PB of the cell structure portion is in a range of 42% to 70%. Further, it is set that a porosity ratio (=PA/PB) which is a value obtained by dividing the porosity PA of the plugging structure portion by the porosity PB of the cell structure portion is in a range of 1.10 to 1.30.

The porosities PA and PB of the plugging structure portion 10 and the cell structure portion 20 of the plugged honeycomb structure 1 are stipulated in the above ranges, respectively, so that it is possible to increase the porosity of the plugged honeycomb structure 1 made of cordierite, and it is possible to decrease pressure loss by the increase of the porosity. Especially, the porosity PA of the plugging structure portion is adjusted into 80% or less, so that it is possible to effectively inhibit generation of a phenomenon (erosion) in which the partition wall 2 and the like of the plugged honeycomb structure 1 are cut off and mechanically abraded by peel of a surface oxidizing layer or surface deposit which is mixed in an exhaust gas.

Furthermore, an average pore diameter of the plugging structure portion 10 is set to a range of 10 µm to 30 µm. Consequently, it is possible to exert particulate removing performance inherent in the plugged honeycomb structure 1 as the filter member while acquiring the above low pressure loss properties. Furthermore, the plugged honeycomb structure is set so that a thermal expansion coefficient difference (=CA−CB) which is a value obtained by subtracting a thermal expansion coefficient CB of the cell structure portion in the diametric direction B from a thermal expansion coefficient CA of the plugging structure portion in the diametric direction B (see FIG. 2) which is perpendicular to the long axis direction A (see FIG. 2) of the plugged honeycomb structure 1 is in a range of $\pm 0.3 \times 10^{-6}$/K.

The difference between the thermal expansion coefficient CA of the plugging structure portion 10 and the thermal expansion coefficient CB of the cell structure portion 20 is suppressed within the above range, so that it is possible to suppress expansion ratios of the plugging structure portion 10 and the cell structure portion 20 into the same degree when a high-temperature fluid flows into the plugged honeycomb structure 1. Through heating and cooling which repeatedly occur during use of the plugged honeycomb structure 1, the plugging portions 5a and 5b themselves do not cause a fatigue phenomenon, and there does not occur the disadvantage that the plugging portions 5a and 5b drop out from the cells 3 due to a high-rate fluid or the like.

2. Manufacturing Method of Plugged Honeycomb Structure

Hereinafter, details to manufacture the plugged honeycomb structure 1 mentioned above will be described. First, various types of ceramic raw material, pore former and surfactant, water and the like are mixed and kneaded into a predetermined viscosity, thereby preparing a plastic kneaded material. Afterward, the kneaded material is extruded by using an extruder, thereby forming an extruded body of a honeycomb structure having a plurality of cells 3, and a honeycomb formed body is obtainable through a treatment such as drying. It is to be noted that in the present embodiment, as the ceramic raw material for use, a material containing the cordierite component as the main component is used.

There is not any special restriction on the type of pore former, and there is usable a well-known pore former such as graphite, flour, starch, phenol resin, polymethyl methacrylate, polyethylene, polyethylene terephthalate, foamable resin, Shirasu balloon or fly ash balloon. By optionally adjusting and changing the type of pore former and an amount of the pore former to be added, it is possible to control the porosity and Young's modulus of a partition wall constituting a ceramic formed body (which corresponds to the partition wall 2 of the plugged honeycomb structure 1 after fired) in the above stipulated ranges.

Furthermore, there is not any special restriction on the surfactant for use, but there is usable, for example, ethylene glycol, dextrin, fatty acid soap, polyalcohol or the like.

On the other hand, a raw material of the plugging member to form the plugging portions 5a and 5b is obtainable by mixing the ceramic raw material, the pore former, the surfactant, water and the like, and adjusting the mixture into a slurry state, followed by using a mixer or the like to perform kneading. It is to be noted that the ceramic raw material for use as the raw material of the plugging member may be the same as the ceramic raw material for use when forming the above-mentioned honeycomb formed body. Furthermore, the same pore former and surfactant as those for use when forming the honeycomb formed body are similarly usable.

As the raw material of the plugging member except for the above materials, there is usable, for example, methylcellulose, hydroxypropoxyl methylcellulose, hydroxypropyl methylcellulose, hydroxyethyl cellulose, carboxymethylcellulose, polyvinyl alcohol or the like.

Especially in the plugging member for use in the plugged honeycomb structure 1 of the present embodiment, polyethylene oxide is used as the thickener. Here, polyethylene oxide is added as the thickener to the plugging member, so that it is possible to suitably obtain a fluidity when charging the plugging member into the ends 4a and 4b of the cells 3 to form the plugging portions 5a and 5b. Therefore, when charging the plugging member into the ends 4a and 4b of the cells 3 in accordance with the predetermined arrangement standard to form the plugging portions 5a and 5b, it is possible to rapidly feed the plugging member into the honeycomb formed body formed as described above. Consequently, a production efficiency of the plugged honeycomb structure 1 can improve.

Here, in the manufacturing method of the plugged honeycomb structure 1 of the present embodiment, the pore former to be added to the plugging member is mixed at a ratio of 1 wt % to 30 wt % to a total amount of the plugging member, and further, the thickener (polyethylene oxide) is mixed at a ratio of 0.1 wt % to 3.0 wt % to the total amount of the plugging member. The ratios of the pore former and thickener to be added are adjusted into the above ranges, so that it is possible to suitably obtain porosities of the plugging portions 5a and 5b (the porosity PA of the plugging structure portion 10), and an operation efficiency at the time of forming the plugging portions 5a and 5b can improve.

It is to be noted that the formation of the plugging portions 5a and 5b is carried out in the following well-known step. That is, cells of parts in one end portion (corresponding to the end 4a after the firing) of the honeycomb formed body obtained by extrusion and drying are subjected to a mask treatment, and then the one end portion is directed downwardly and pressed onto a container in which the plugging member adjusted into the slurry state is disposed. As a result, the plugging member is pressed into the cells which are not subjected to the mask treatment, whereas the plugging member is not pressed into the cells subjected to the mask treatment. The plugging member is pressed into a predetermined depth, and then the honeycomb formed body is lifted up from the container in which the plugging member is disposed, whereby the cells in the one end portion are plugged in accordance with the predetermined arrangement standard. Similarly, also to the other end portion of the honeycomb formed body (which corresponds to the other end 4b after the firing), a treatment similar to the above treatment is performed. The plugging portions 5a and 5b are formed by drying the plugging member pressed into the cells.

It is to be noted that there is not any special restriction on a technique of the mask treatment to the one or other end portion of the honeycomb formed body, but there is usable, for example, a method of attaching an adhesive film to one (or the other) end portion of the honeycomb formed body and partially performing piercing to the adhesive film. At this time, in the piercing to the adhesive film, a well-known technology of irradiation with laser is usable only in portions corresponding to the cells which form the plugging portions 5a and 5b. Furthermore, there is not any special restriction on a material of the adhesive film, and a film made of polyester, polyethylene or any resin such as any type of thermosetting resin is optionally selected and usable. Furthermore, one surface of the adhesive film is coated with an adhesive component to suitably obtain close contact properties with the one (or the other) end portion of the honeycomb formed body.

As described above, the plugging member is pressed into the one end portion and the other end portion of the honeycomb formed body, and then drying is performed at a drying temperature of 80 to 150° C. for 5 minutes to about 2 hours. After the drying, the honeycomb formed body is fired on predetermined firing conditions, thereby completing the plugged honeycomb structure 1 of the present embodiment.

Hereinafter, examples of the plugged honeycomb structure and the manufacturing method of the plugged honeycomb structure of the present invention will be described, but the plugged honeycomb structure and the manufacturing method of the plugged honeycomb structure of the present invention are not especially limited to these examples.

EXAMPLES

3. Measuring Method of Young's Modulus

Figure 5:
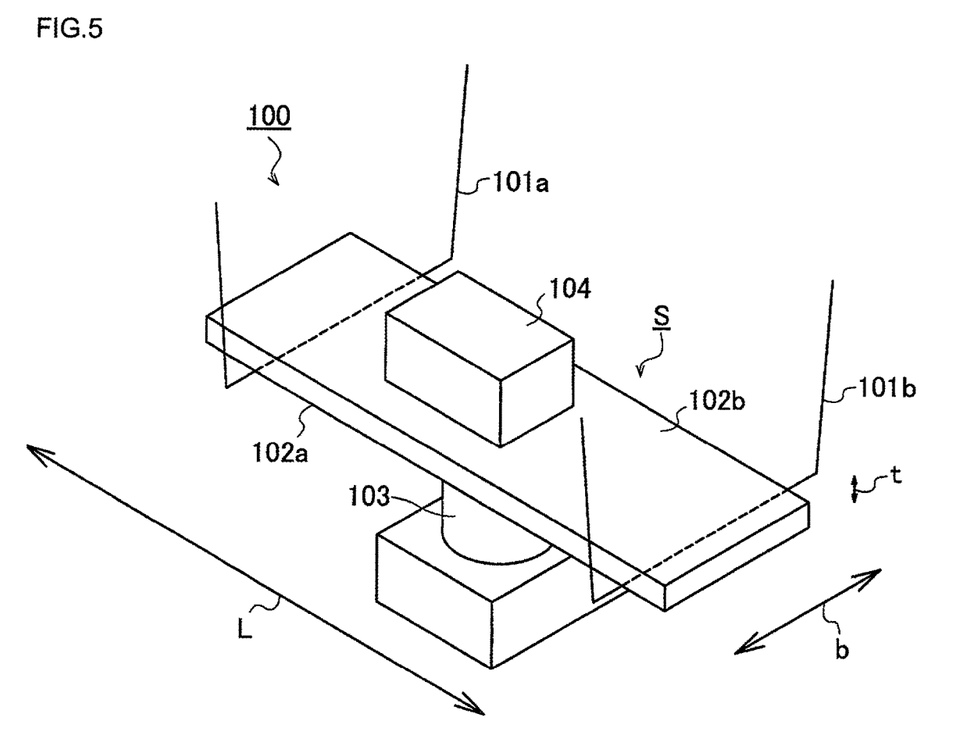
FIG. 5 is an explanatory view schematically showing one example of a measuring device of Young's modulus.

A Young's modulus measuring method of measuring values of Young's moduli YA and YB of a plugging structure portion and a cell structure portion to stipulate a plugged honeycomb structure of the present embodiment is carried out on the basis of the following procedure (1) to (8) by use of a measuring device 100 schematically shown in FIG. 5.

The measuring device 100 is used to measure the Young's moduli YA and YB by use of a measuring principle in a resonance method. A range of a resonance frequency fin the measuring device 100 was set to a range of 300 to 10000 Hz, and measurement samples S were cut out from a plugging structure portion 10 and a cell structure portion 20 of a plugged honeycomb structure 1 so that as dimensions of each sample, a sample length L was in a range of 40 to 120 mm, a sample width b was in a range of 10 to 25 mm, and a sample thickness t was in a range of 1 to 12 mm. In this case, a measuring method of the Young's modulus is defined as a diametric direction B (see FIG. 2) of the plugged honeycomb structure 1 as described above.

(1) The sample width b and the sample thickness t of each measurement sample S cut out from the plugged honeycomb structure are measured to a unit of 0.01 mm by use of a micrometer or a Vernier scale. Here, as measuring regions, measurement is performed in three regions in total which includes a central position of the measurement sample S and vicinities of both ends of the measurement sample S.

(2) Next, the sample length L of the measurement sample S is measured by using the Vernier scale. The sample length L is also measured to the unit of 0.01 mm in the same manner as in the above (1).

(3) Conformation of corner portion finishing or the like is performed as required, and then positions of 22.4% (an allowable difference of ±0.5 mm) of the sample length L from both ends of the measurement sample S are marked (not shown) to position sample supporting wires 101a and 101b, respectively.

(4) Carbon is sprayed to one surface 102a (a lower surface) of the measurement sample S to impart conductivity thereto.

(5) For the purpose of removing a binder component included in the carbon spray, the measurement sample S is mounted in an electric furnace set at 500° C. and heated for 2 hours.

(6) A weight M of the measurement sample S which is taken out from the electric furnace and cooled is measured in an electronic balance. At this time, the number of significant digits is set up to 4.

(7) The measurement sample S is set in the measuring device 100 (see FIG. 5). At this time, positioning is performed so that a pair of sample supporting wires 101a and 101b are positioned at the positions marked in the above (3), to obtain a state of suspending the measurement sample S with the pair of sample supporting wires 101a and 101b. Here, one surface 102a side of the measurement sample S coated with the carbon spray is directed downwardly, thereby establishing the conductivity between the pair of sample supporting wires 101a and 101b via the measurement sample S.

Furthermore, the measurement sample S is disposed so that an electrode surface (not shown) of an electrode 103 faces a lower position of the measurement sample S which is as much as 0.2 mm away from the one surface 102a of the measurement sample S. Furthermore, a sensor 104 is disposed at an upper position of the measurement sample S which is as much as about 2 mm away from another surface 102b (an upper surface) of the measurement sample S. Consequently, the measurement sample S is set in the measuring device 100 in a state of sandwiching the plate-like measurement sample S between the sensor 104 and the electrode 103 from the upside and the downside. At this time, a stipulated gap is formed in each of portions between the electrode 103 and the one surface 102a of the measurement sample S and between the sensor 104 and the other surface 102b of the measurement sample S. That is, each of the electrode 103 and the sensor 104 is not directly in contact with the measurement sample S.

(8) After completing the setting of the measurement sample S to the measuring device 100, the measuring device 100 is brought into an operating state, thereby measuring the resonance frequency f. The values of the Young's moduli YA and YB to the respective measurement samples S are calculated on the basis of the value of the resonance frequency f which is obtained by the measurement. At this time, Equation (1) mentioned below is used in the calculation of the Young's moduli YA and YB. Here, in Equation (1) mentioned below, E is the Young's modulus (Pa), f is the resonance frequency (Hz), M is the weight (g) of the measurement sample S, t is the sample thickness (m), b is the sample width (m), and L is the sample length (m) (units are indicated in parentheses).

$$E = 0.9465 \frac{Mf^2}{b} \left(\frac{L}{t}\right)^3 \left[1 + 6.59\left(\frac{t}{L}\right)^2\right]$$

The measurements of the Young's modulus of the plugging structure portion and the cell structure portion were performed in accordance with the above procedure (1) to (8). Furthermore, the value of the Young's modulus YA of the plugging structure portion was divided by the value of the Young's modulus YB of the cell structure portion to calculate the Young's modulus ratio (=YA/YB) (see Table 1).

4. Measurement of Porosity

Porosities PA and PB of the plugging structure portion and the cell structure portion were measured by suitably using mercury porosimetry or Archimedes method which has heretofore been a well-known measuring technique. It is to be noted that details of the measuring technique of the porosities PA and PB are omitted. Afterward, the measured porosity PA of the plugging structure portion was divided by the porosity PB of the cell structure portion to calculate a porosity ratio (=PA/PB) (see Table 1).

5. Measurement of Thermal Expansion Coefficient

An average thermal expansion coefficient in a temperature range of 40° C. to 800° C. was measured and obtained for each of the plugging structure portion and the cell structure portion by use of a differential detection type of thermal dilatometer. Further specifically, first a measurement sample of a vertical size of 5 mm×a horizontal size of 5 mm×a length of 50 mm was prepared from each of the plugging structure portion and the cell structure portion. Additionally, a measuring direction of the thermal expansion coefficient was defined as the diametric direction B of the plugged honeycomb structure 1 (see FIG. 2) in the same manner as in the above-mentioned Young's modulus measuring method. A thermal expansion coefficient difference (=the plugging structure portion−the cell structure portion) was calculated on the basis of the respective obtained values (see Table 1).

Figure 6:
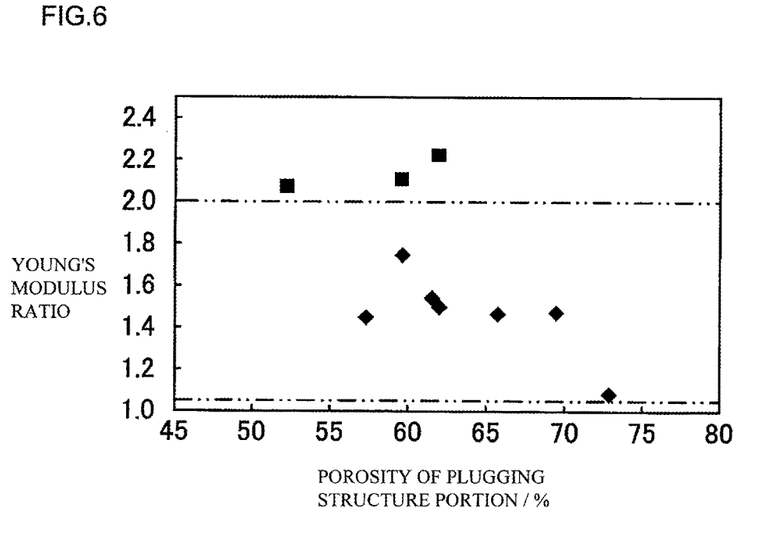
FIG. 6 is a graph showing a correlation between a porosity of a plugging structure portion and a Young's modulus ratio.

Table 1 mentioned below shows a summary of values of a partition wall thickness of a partition wall of a plugged honeycomb structure, a cell density, the respective measured and calculated Young's moduli YA and YB and Young's modulus ratio and the like in plugged honeycomb structures of Examples 1 to 7 and Comparative Examples 1 to 4. Furthermore, FIG. 6 shows a correlation between the porosity PA of the plugging structure portion and the Young's modulus ratio. Furthermore, there were visually confirmed presence/absence of generation of cracks in structure end portions of each of the plugged honeycomb structures of Example 1 to 7 and Comparative Examples 1 to 4, and presence/absence of dropping-out of plugging portions from the plugging structure portion. Furthermore, Table 1 also shows a measured plugging depth of each plugging portion pressed into each plugged honeycomb structure.

TABLE 1

| Item | Unit | Example 1 | Example 2 | Example 3 | Example 4 | Example 5 | Example 6 | Example 7 |
|---|---|---|---|---|---|---|---|---|
| Partition wall thickness | mil | 8 | 8 | 8 | 8 | 12 | 12 | 6 |
| | (mm) | (0.20) | (0.20) | (0.20) | (0.20) | (0.30) | (0.30) | (0.15) |
| Cell density | cpsi | 200 | 200 | 200 | 200 | 300 | 300 | 200 |
| | (cells/cm$^2$) | (31) | (31) | (31) | (31) | (47) | (47) | (31) |
| Plugging depth | mm | 5.6 | 7.6 | 8.5 | 6.2 | 5.2 | 9.5 | 7.2 |
| Young's modulus of plugging structure portion (YA) | GPa | 1.59 | 1.78 | 1.64 | 1.56 | 3.10 | 1.18 | 1.80 |
| Young's modulus of cell structure portion (YB) | GPa | 1.03 | 1.13 | 1.10 | 1.04 | 2.10 | 1.09 | 1.00 |
| Young's modulus ratio (=YA/YB) | — | 1.54 | 1.58 | 1.49 | 1.50 | 1.48 | 1.08 | 1.80 |
| Porosity of plugging member | % | 65.0 | 65.0 | 72.0 | 78.0 | 60.8 | 78.0 | 64.0 |
| Porosity of plugging structure portion (PA) | % | 62.1 | 61.6 | 66.0 | 69.7 | 57.3 | 73.0 | 59.6 |
| Porosity of cell structure portion (PB) | % | 55.8 | 56.1 | 57.5 | 56.6 | 52.0 | 64.6 | 48.0 |
| Porosity ratio (=PA/PB) | — | 1.11 | 1.10 | 1.15 | 1.23 | 1.10 | 1.13 | 1.24 |
| Average pore diameter of cell structure portion | µm | 13.0 | 13.9 | 15.7 | 14.5 | 10.0 | 21.2 | 11.3 |
| Average pore diameter of plugging structure portion | µm | 15.1 | 14.5 | 17.9 | 20.1 | 12.5 | 18.5 | 12.3 |
| Thermal expansion coefficient difference (plugging structure portion − cell structure portion) | 10$^{-6}$/K | 0.10 | 0.13 | 0.20 | 0.25 | 0.20 | 0.05 | 0.30 |

TABLE 1-continued

| | | | | | | | |
|---|---|---|---|---|---|---|---|
| Presence of cracks of end portions | None | None | None | None | None | None | None |
| Presence of desorption of plugging portions | None | None | None | None | None | None | None |

| Item | Unit | Comparative Example 1 | Comparative Example 2 | Comparative Example 3 | Comparative Example 4 |
|---|---|---|---|---|---|
| Partition wall thickness | mil (mm) | 8 (0.20) | 12 (0.30) | 12 (0.30) | 5 (0.13) |
| Cell density | cpsi (cells/cm$^2$) | 200 (31) | 200 (31) | 300 (47) | 400 (62) |
| Plugging depth | mm | 5.3 | 6.5 | 8.0 | 6.2 |
| Young's modulus of plugging structure portion (YA) | GPa | 2.36 | 1.68 | 1.78 | 1.82 |
| Young's modulus of cell structure portion (YB) | GPa | 1.15 | 0.80 | 0.80 | 1.02 |
| Young's modulus ratio (=YA/YB) | — | 2.05 | 2.10 | 2.23 | 1.78 |
| Porosity of plugging member | % | 55.0 | 60.8 | 61.0 | 78.0 |
| Porosity of plugging structure portion (PA) | % | 52.2 | 59.7 | 62.1 | 60.9 |
| Porosity of cell structure portion (PB) | % | 49.4 | 58.0 | 68.5 | 48.0 |
| Porosity ratio (=PA/PB) | — | 1.06 | 1.03 | 0.91 | 1.28 |
| Average pore diameter of cell structure portion | μm | 12.3 | 15.9 | 19.9 | 11.5 |
| Average pore diameter of plugging structure portion | μm | 10.2 | 14.5 | 17.3 | 15.5 |
| Thermal expansion coefficient difference (plugging structure portion − cell structure portion) | $10^{-6}$/K | 0.10 | 0.10 | 0.15 | 0.32 |
| Presence of cracks of end portions | | Present | Present | Present | None |
| Presence of desorption of plugging portions | | None | None | None | Present |

As shown in Table 1, it was confirmed that in each of the plugged honeycomb structures of Examples 1 to 7, each of the Young's modulus ratio, the porosity of the plugging structure portion, the porosity of the cell structure portion, the porosity ratio, the average pore diameter of the plugging structure portion and the thermal expansion coefficient difference was within a range stipulated in the present invention, and consequently, the cracks of the end portions and the desorption of the plugging portions were not confirmed in each example. That is, it has been proved that in the plugged honeycomb structure of the present invention, the end portions are hard to crack and the plugged honeycomb structure has a sufficient strength and is excellent in durability.

On the other hand, in each of the plugged honeycomb structures (Comparative Examples 1 to 3) in which the Young's modulus ratio was 2.00 or more and the porosity ratio was smaller than 1.10, the generation of the cracks was confirmed in the end portions. That is, it is considered that a distortion difference increases when stress is applied, and the cracks and the like are generated. Furthermore, in the plugged honeycomb structure (Comparative Example 4) in which the thermal expansion coefficient difference was ±0.3×10$^{-6}$/K or more, the desorption of the plugging portions was recognized.

6. Effect of Fluidity of Plugging Member by Pore Former and Thickener

Table 2 mentioned below shows an improving effect of fluidity of a plugging member due to a use ratio of a pore former and a use ratio of a thickener to a total amount of the plugging member. Here, the plugged honeycomb structures of Example 8 to Example 12 satisfy conditions that the pore former is mixed at a ratio of 1 wt % to 30 wt % to the total amount of the plugging member and that the thickener is mixed at a ratio of 0.1 wt % to 3.0 wt % to the total amount of the plugging member. On the other hand, the plugged honeycomb structure of Comparative Example 5 satisfies requirements concerning the pore former (=1 wt %), but does not satisfy requirements concerning the thickener (=0 wt %). Furthermore, the plugged honeycomb structure of Comparative Example 6 satisfies requirements concerning the thickener (=0.2 wt %), but does not satisfy requirements concerning the pore former (=0 wt %).

TABLE 2

| Item | | Example 8 | Example 9 | Example 10 | Example 11 | Example 12 | Comparative Example 5 | Comparative Example 6 |
|---|---|---|---|---|---|---|---|---|
| Ratio of pore former to total amount of plugging member | wt % | 5 | 10 | 15 | 15 | 20 | 1 | 0 |
| Ratio of thickener to total amount of plugging member | wt % | 0.2 | 0.2 | 0.2 | 0.8 | 1.5 | 0 | 0.2 |
| Mass ratio of thickener/pore former | — | 0.04 | 0.02 | 0.01 | 0.05 | 0.07 | 0 | — |
| Porosity (PA) of plugging structure portion | % | 55 | 62 | 69 | 65 | 71 | 52 | 52 |
| Porosity of plugging member | % | 59 | 65 | 70 | 72 | 78 | 55 | 48 |

TABLE 2-continued

| Item | | Example 8 | Example 9 | Example 10 | Example 11 | Example 12 | Comparative Example 5 | Comparative Example 6 |
|---|---|---|---|---|---|---|---|---|
| Plugging depth (permeation depth from end portion) | mm | 8.0 | 6.2 | 5.2 | 9.0 | 10.0 | 2.0 | 10.0 |

Consequently, it is indicated that the porosity of the plugging structure portion and the porosity of the plugging member in each of Examples 8 to 12 are higher than those in each of Comparative Examples 5 and 6. That is, it has been confirmed that adding of the pore former has a noticeable influence on increase of the porosity of the plugged honeycomb structure.

"The plugging depth" which is a pressing depth of the plugging member from the end portion is usually set to a range of 2 mm or more and 11 mm or less. That is, when the plugging depth is smaller than 2 mm, strength of the plugging portions themselves becomes insufficient and there is the possibility that the plugging portions desorb from the plugging structure portion during use. On the other hand, when the plugging depth is in excess of 11 mm, there occurs the disadvantage that pressure loss increases.

As shown in Table 2, it has been confirmed that as a ratio of an amount of the pore former to the total amount of the plugging member increases, a value of the plugging depth decreases in a case where a ratio of an amount of the thickener is the same (see Examples 8 to 10). That is, by adding of the pore former, the fluidity of the plugging member deteriorates. On the other hand, it has been confirmed that in a case where the ratio of the amount of the pore former is the same and the ratio of the amount of the thickener to the total amount of the plugging member changes (Examples 10 and 11), the plugging depth increases (from 5.2 mm to 9.0 mm) in the plugged honeycomb structure of Example 11 in which the ratio of the amount of the thickener is high. Consequently, it has been confirmed that also in a case of adding the pore former, the fluidity of the plugging member improves by the adding of the thickener. Furthermore, also in a case of increasing the ratio of the amount of the pore former to 20 wt % (Example 12), the ratio of the amount of the thickener is set to 1.5 wt %, the plugged honeycomb structure accordingly indicates the plugging depth of the same degree as in a conventional plugged honeycomb structure in which the pore former is not added, and the porosity of the plugging structure portion can increase.

That is, in a manufacturing method of the honeycomb structure of the present invention, as stipulated, the pore former is mixed at the ratio of 1 wt % to 30 wt % to the total amount of the plugging member and the thickener is mixed at the ratio of 0.1 wt % to 3.0 wt % to the total amount of the plugging member, and it has been confirmed that the porosities of the plugged honeycomb structure and the plugging structure portion can increase, the fluidity of the plugging member can stabilize, the plugging portions have a sufficient strength without desorbing from the plugging structure portion, and there is not the fear of causing the increase of the pressure loss.

A plugged honeycomb structure and a manufacturing method of the plugged honeycomb structure of the present invention are especially suitably utilizable in a plugged honeycomb structure including partition walls having a high porosity and a large open frontal area and a manufacturing method of the plugged honeycomb structure.

DESCRIPTION OF REFERENCE NUMERALS

1: plugged honeycomb structure, 2: partition wall, 3: cell, 4a: one end, 4b: the other end, 5a and 5b: plugging portion, 6: honeycomb portion, 7: circumferential wall portion, 10: plugging structure portion, 20: cell structure portion, 100: measuring device, 101a and 101b: sample supporting wire, 102a: one surface, 102b: the other surface, A: long axis direction, B: diametric direction, b: sample width, CA: thermal expansion coefficient of plugging structure portion, CB: thermal expansion coefficient of cell structure portion, L: sample length, PA: porosity of plugging structure portion, PB: porosity of cell structure portion, S: measurement sample, t: sample thickness, YA: Young's modulus of plugging structure portion, and YB: Young's modulus of cell structure portion.

What is claimed is:

1. A plugged honeycomb structure having a plurality of cells defined by partition walls to become through channels for a fluid, one end of each of a plurality of predetermined cells of the plurality of cells being plugged by a plugging member, the other end of each of a plurality of residual cells of the plurality of cells being plugged by the plugging member,
    wherein the partition walls are made of a cordierite component as a main component, and the plugging member is made of a ceramic,
    a depth of the plugging member is 2 mm or more and 11 mm or less,
    a porosity of a plugging structure portion is 80% or less, wherein the plugging structure portion is formed by the partition walls and the plugging member,
    a porosity of a cell structure portion is in a range of 42% to 70%, wherein the cell structure portion is formed by the partition walls, and
    a value obtained by dividing a Young's modulus of the plugging structure portion by a Young's modulus of the cell structure portion is in a range of 1.05 to 2.00.

2. The plugged honeycomb structure according to claim 1, wherein
    a value obtained by dividing the porosity of the plugging structure portion by the porosity of the cell structure portion is in a range of 1.10 to 1.30.

3. The plugged honeycomb structure according to claim 1, wherein an average pore diameter of the plugging structure portion is in a range of 10 μm to 30 μm.

4. The plugged honeycomb structure according to claim 1, wherein a value obtained by subtracting a thermal expansion coefficient of the cell structure portion from a thermal expansion coefficient of the plugging structure portion in a diametric direction which is perpendicular to a long axis direction of the plugged honeycomb structure is in a range of $\pm 0.3 \times 10^{-6}$/K.

5. A manufacturing method of the plugged honeycomb structure according to claim 1 which has the plurality of cells defined by the partition walls to become through channels for the fluid, one end of each of the predetermined cells of the plurality of cells being plugged by the plugging member, the other end of each of the residual cells of the plurality of cells being plugged by the plugging member,
   wherein the plugging member includes the ceramic, a pore former, a surfactant, and a thickener,
   the pore former is mixed at a ratio of 1 wt % to 30 wt % to a total amount of the plugging member, and
   the thickener is mixed at a ratio of 0.1 wt % to 3.0 wt % to the total amount of the plugging member.

* * * * *